United States Patent
Couse et al.

(10) Patent No.: US 10,848,616 B2
(45) Date of Patent: Nov. 24, 2020

(54) PORTABLE VOICE UNIT COMMUNICATIONS VIA A COMMUNICATION DEVICE

(71) Applicant: MITEL NETWORKS CORPORATION, Ottawa (CA)

(72) Inventors: Peter Couse, Ottawa (CA); Jay McIntosh, Ottawa (CA)

(73) Assignee: Mitel Networks Corporation, Ottawa (CA)

( * ) Notice: Subject to any disclaimer, the term of this patent is extended or adjusted under 35 U.S.C. 154(b) by 0 days.

(21) Appl. No.: 16/182,987

(22) Filed: Nov. 7, 2018

(65) Prior Publication Data
US 2019/0141186 A1 May 9, 2019

Related U.S. Application Data

(60) Provisional application No. 62/707,582, filed on Nov. 8, 2017.

(51) Int. Cl.
*H04M 3/42* (2006.01)
*H04M 1/725* (2006.01)
*H04M 1/60* (2006.01)
*H04M 1/247* (2006.01)

(52) U.S. Cl.
CPC ..... *H04M 3/42263* (2013.01); *H04M 1/6033* (2013.01); *H04M 1/72583* (2013.01); *H04M 1/247* (2013.01)

(58) Field of Classification Search
CPC ....... H04W 4/16; H04W 84/16; H04W 88/06; H04M 1/02; H04M 1/03; H04M 1/05; H04M 1/0237; H04M 1/0295; H04M 1/72505; H04M 1/72511
USPC .............. 455/417, 426.1, 462–465; 379/419, 379/428.01–428.04, 430–431
See application file for complete search history.

(56) References Cited

U.S. PATENT DOCUMENTS

| | | | | |
|---|---|---|---|---|
| 2004/0218583 A1* | 11/2004 | Adan | ...... | H04L 29/06 370/352 |
| 2008/0068446 A1* | 3/2008 | Barkley | ...... | H04N 7/147 348/14.07 |
| 2010/0144400 A1* | 6/2010 | Azuma | ...... | H04M 1/6075 455/569.2 |
| 2011/0047581 A1* | 2/2011 | Caspi | ...... | H04L 12/66 725/80 |
| 2011/0081925 A1* | 4/2011 | Kwon | ...... | H04L 67/14 455/466 |
| 2016/0286022 A1* | 9/2016 | Fukuda | ...... | H04M 1/72558 |

* cited by examiner

*Primary Examiner* — Matthew W Genack (57) ABSTRACT

A portable voice unit communications via a communication device is provided. A controller of the communication device establishes, using a transceiver, a wireless connection with a portable voice unit. The controller receives, via an input device, a selection of a given audio accessory from a plurality of audio accessories, the communication device acting as a communication hub between the portable voice unit and the plurality of audio accessories. The controller provides, between the portable voice unit and the wireless connection, a voice call. The controller connects, to the given audio accessory, the voice call.

20 Claims, 5 Drawing Sheets

PORTABLE VOICE UNIT COMMUNICATIONS VIA A COMMUNICATION DEVICE

FIELD OF THE SPECIFICATION

The present specification generally relates to communication devices, such as desk phones and the like, and methods therefore. More particularly, exemplary embodiments of the specification relate to communication devices, systems including the communication devices, and methods of using the communication devices.

BACKGROUND OF THE SPECIFICATION

Communication devices, such as desk phones, stationary phones, and the like, generally communicate with a call server (such as a PBX (private branch exchange), which may be implemented as an internet protocol (IP) based branch exchange), for example via a local area network, to receive and manage calls. Such communication devices and/or stationary phones may be used in a business entity (e.g. an office) environment with a call server in communication with the communication devices and/or stationary desk phones via a local area network operated by, and/or associated with, the business entity. However, users of communication devices and/or stationary phones often use a portable voice unit to receive and make calls, in addition to a communication device and/or stationary phone. Such portable voice units may include mobile phones that store contacts to be called, devices that run virtual assistants, and the like, which connect to a cellular network and/or a WiFi network. However, the communication devices and/or stationary phones can have more sophisticated hardware and/or features, for example offered by a call server connected to the communication devices and/or stationary phones, that the portable voice unit cannot provide.

Furthermore, mobile phones use an established portable telephone technology that allows a user to maintain a voice call relying on a radio frequency connection while the user is on the move. Hence, there exists a problem of receiving a voice call on a mobile phone via a wireless service provider, but not being able to pick up that same voice call at a desk phone (e.g. a stationary phone). Indeed, while a user may want to move an important voice call from their mobile phone to their desk phone, most desk phone systems are not compatible with mobile wireless technology. For example, modern IP-based desk phones use local area network connections that cannot be registered with wireless network carriers. Thus, a common user communications scenario requires the mobile phone user to tell the other phone call participant that they will have to "hold on a moment" while they hang up and then call back that participant from their desk phone (or a pay phone, or any other suitable type of phone). This means ending the mobile phone call before placing a new voice call to the participant involved in that voice call from a desk phone, which can have an impact to productivity and an interruption to the flow of the conversation where, for example, the user often states "Now, where were we again?".

Accordingly, improved methods and devices for implementing portable voice unit communications via a communication device and/or a desk phone and/or a stationary phone are desired.

BRIEF DESCRIPTION OF THE DRAWING FIGURES

Subject matter of the present specification is particularly pointed out and distinctly claimed in the concluding portion of the specification. A more complete understanding of the present specification, however, may best be obtained by referring to the detailed description and claims when considered in connection with the drawing figures.

DETAILED DESCRIPTION OF EXEMPLARY EMBODIMENTS

The description of various embodiments of the present specification provided below is merely exemplary and is intended for purposes of illustration only; the following description is not intended to limit the scope of the specification disclosed herein. Moreover, recitation of multiple embodiments having stated features is not intended to exclude other embodiments having additional features or other embodiments incorporating different combinations of the stated features.

The specification describes exemplary devices, systems, and methods. As set forth in more detail below, exemplary devices, systems, and methods described herein may be conveniently used in home or office settings. However, the specification is not limited to such applications.

An aspect of the specification provides a method of providing portable voice unit communications via a communication device, the method comprising: establishing, using a transceiver of the communication device, a wireless connection with a portable voice unit; receiving, at an input device of the communication device, a selection of a given audio accessory from a plurality of audio accessories, the communication device acting as a communication hub between the portable voice unit and the plurality of audio accessories; providing, between the portable voice unit and the communication device, via the wireless connection, a voice call; and connecting, from the communication device to the given audio accessory, the voice call.

Another aspect of the specification provides a communication device for providing portable voice unit communications, the communication device comprising: a transceiver; an input device; and a controller communicatively coupled to the transceiver and the input device, the controller configured to: establish, using the transceiver, a wireless connection with a portable voice unit; receive, at the input device, a selection of a given audio accessory from a plurality of audio accessories, the communication device acting as a communication hub between the portable voice unit and the plurality of audio accessories; provide, between the portable voice unit and the wireless connection, a voice call; and connect, to the given audio accessory, the voice call.

For example, the present specification generally provides a method for streaming audio, such as voice calls, between devices, and more particularly it relates to providing a voice call from a mobile device (such as a cell phone) and being able to answer or terminate that same mobile voice call on a communication device, such as a desktop phone, a stationary phone (including, but not limited to, a VoIP (Voice Over Internet Protocol Phone)), and the like, and/or an audio accessory that is associated and/or paired with the communication device, wherein the voice calls may be conveyed between the mobile phone, the communication device and the audio accessory using a same or different wireless standard protocol (such as Bluetooth™, Wi-Fi technology, wideband, or narrow-band wireless audio). The voice call may be further conveyed to a second communication device, via a first communication device where the voice call is initially provided from a mobile phone, via a local area network (LAN) and/or a call server, and the like. Such a LAN may be a wired LAN, a WiFi Wireless LAN and/or a cellular-based LAN.

Figure 1:
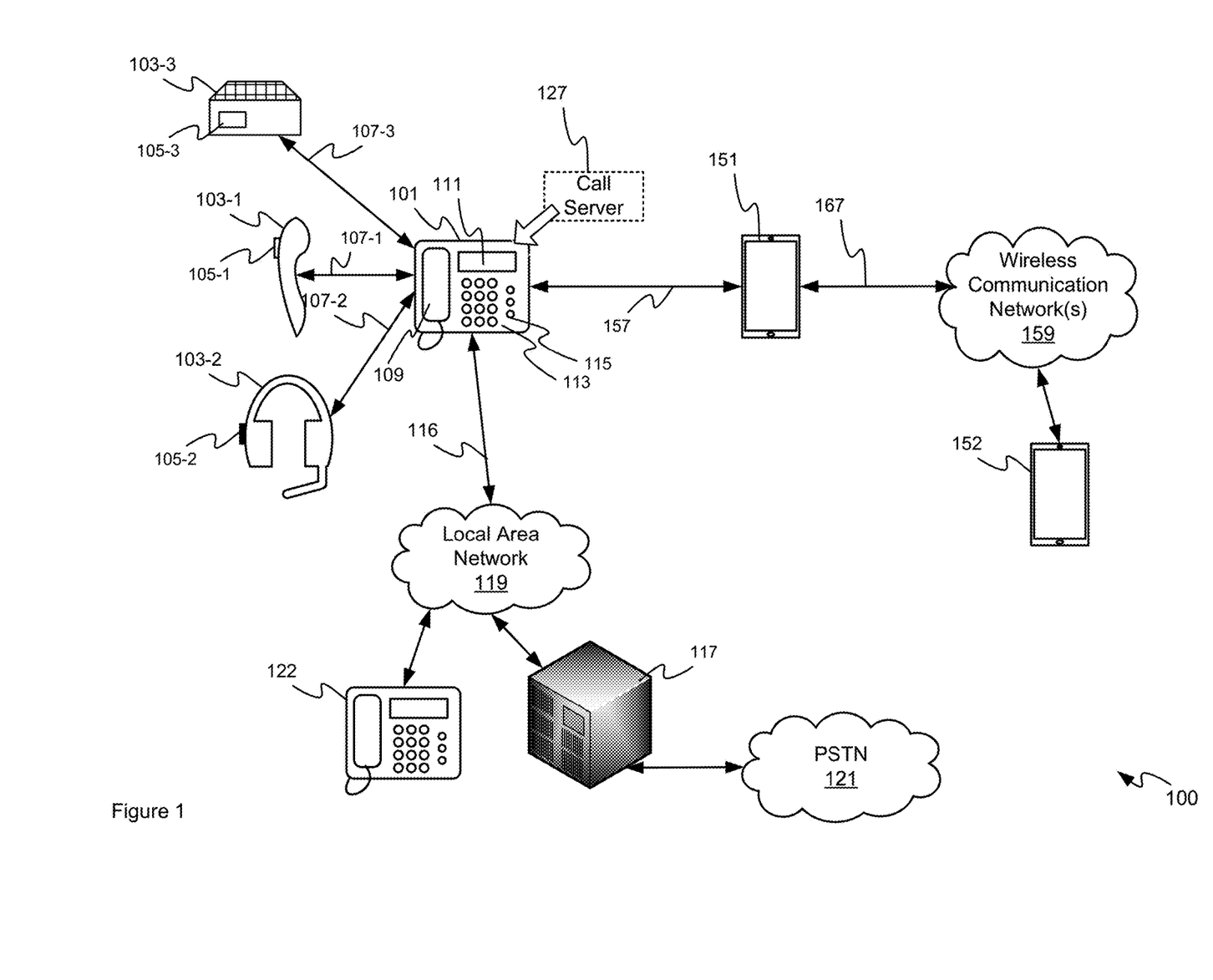
FIG. 1 illustrates a system in accordance with exemplary embodiments of the specification.

FIG. 1 illustrates a system 100 in accordance with exemplary embodiments of the specification. System 100 includes a communication device 101 configured to communicate with a plurality of audio accessories 103-1, 103-2, 103-3 (interchangeably referred to hereafter, collectively, as audio accessories 103 and, generically, as an audio accessory 103). As depicted, each audio accessory 103 includes a respective talk/end call button 105-1, 105-2, 105-3 (interchangeably referred to hereafter, collectively, as buttons 105 and, generically, as a button 105); each button 105 may be activated at a respective audio accessory 103 to connect or end a voice call managed by the communication device 101. While not depicted, each audio accessory 103 generally comprises a speaker and a microphone and/or any suitable components for conducting voice calls. While only three audio accessories 103 are depicted, the system 100 may comprise any suitable number of audio accessories 103.

Each audio accessory 103 is in communication with the communication device 101 via a respective connection 107-1, 107-2, 107-3 (interchangeably referred to hereafter, collectively, as the connections 107 and, generically, as a connection 107). Each connection 107 may be wired or wireless as desired. For example, as depicted, the audio accessory 103-1 comprises a DECT (digital enhanced cordless communications) handset and hence the respective connection 107-1 is wireless. However the audio accessories 103-2, 103-3 respectively comprise a headset and a speakerphone device, and the respective connections 107-2, 107-3 may each be wireless and/or wired as desired. For example, when wireless, either of the connections 107-2, 107-3 may comprise a Bluetooth™ connection, a Zigbee™ connection, a WiFi connection, and/or any suitable wideband, and/or narrow-band connection, and the like. Regardless, each of the connections 107 may be local communication connections. Furthermore, while the depicted audio accessories 103 are external to the communication device 101, one or more of the audio accessories 103 may be internal to the communication device 101 and/or a component of the communication device 101; for example, one or more of the audio accessories 103 may comprise a speaker/microphone integrated with the communication device 101 and/or a wired handset of the communication device 101.

As depicted, the communication device 101 is embodied as a desk phone and/or a stationary phone, and comprises a respective wired handset 109, a display screen 111 (which may be optional), an input device 113 which, as depicted, includes a keypad and various other buttons including one or more buttons 115 which may include, but are not limited to, a talk/end call button, a Speaker/Headset button and the like. Furthermore, the communication device 101 is configured to maintain a network connection 116, for example, to a call server 117 via a local area network (LAN) 119. The caller server 117 is connected to the public switched telephone network (PSTN) 121, and the like, via a respective connection (depicted in FIG. 1 as a double-ended arrow; indeed all connections in FIG. 1 are depicted as double-ended arrows).

As depicted, the system 100 further comprises a second communication device 122 which may communicate with the communication device 101 via a respective connection to the LAN 119. Indeed, the system 100 may comprise any suitable number of communication devices connected to the LAN 119, for example as desk phones in a business, a call center, and the like. In general, the call server 117 generally manages voice calls to the communication device 101, for example from the PSTN 121 and/or the second communication device 122 via the LAN 119 (and the like). The call server 117 may be embodied as a private branch exchange (PBX) call server including, but not limited to, an Internet Protocol (IP) based call server. Furthermore, while not depicted, the second communication device 122 may include audio accessories similar to the audio accessories 103. The LAN 119 may include, but is not limited to, one or more of a wired LAN, a WiFi Wireless LAN, a cellular-based LAN (e.g. using an LTE Long Term Evolution) network), and the like.

In some examples, however, the system 100 may further comprise an analog circuit-switched network, and one or more analog phone equipped to receive voice calls on multiple ringing lines; in these examples, voice calls received at the communication device 101 may be connected to one or more of such analog phones via such an analog circuit-switched network.

The call server 117 further provides call-server based features to the communication device 101 which may include, but is not limited to, one or more of call parking, recording a voice call, group ringing (e.g. at both communication devices 101, 122), call pickup (e.g. a voice call may be picked up at one or both of the communication devices 101, 122) call forwarding, call multiplexing, call conferencing, three-way calling and/or any other suitable call-server based features; indeed, such a call server 117 may be configured to provide tens to hundreds of call-server based features to the communication device 101 (and the communication device 122).

As depicted, the communication device 101 may alternatively comprise a call server 127, which may be similar to the call server 117, but adapted for the functionality and/or processing resources of the communication device 101. In yet further examples, call server features may be implemented at the communication device 101 without the communication device 101 operating a call server.

Indeed, as depicted, the communication device 101 (and the second communication device 122) is embodied as a desk phone. However, the communication device 101 may be embodied as any suitable communication device having similar functionality of the depicted communication device 101, and which may rely on a call server to provide call-server based features, for example via a LAN.

The communication device 101 is further in communication with a portable voice unit 151 via a respective wireless connection 157 which may include, but is not limited to, a Bluetooth™ connection, a Zigbee™ connection, a WiFi connection, any suitable wideband, and/or narrow-band connection, and the like. When the wireless connection 157 comprises a Bluetooth™ connection, and one or more of the connections 107 also comprise a Bluetooth™ connection, the communication device 101 may be configured to communicate over a plurality of Bluetooth™ connections via one or more Bluetooth™ transceivers.

As depicted, the portable voice unit 151 comprises a mobile phone, however the portable voice unit 151 may comprise any suitable portable voice unit including, but not limited to, portable devices operating and/or interfacing with virtual assistants such as Alexa™, Siri™, Google Assistant™, and the like.

Regardless, the portable voice unit 151 is generally configured to conduct voice calls, for example, as depicted, with a second portable voice unit 152 via one or more wireless communication networks 159 (interchangeable referred to hereafter as the network 159) which may include, but are not limited to, one or more cellular communication networks, one or more WiFi communication networks and the like, and/or a combination thereof. Indeed, a wireless connection 167 between the portable voice unit 151 and the network 159 may comprise a cellular telephone connection, a WiFi connection, and the like. While not depicted, the network 159 may be in communication with the PSTN 121 such that the portable voice unit 151 may conduct voice calls with non-portable voice units, and the like. In yet further examples, the portable voice unit 151 may conduct voice calls with portable or non-portable voice units via social media applications, and/or a soft client, and the like, at the portable voice unit 151.

In general, the communication device 101 is configured to act as a communication hub between the portable voice unit 151 and the plurality of audio accessories 103. For example, when the portable voice unit 151 is within range of a wireless transceiver of the communication device 101, the wireless connection 157 may be established therebetween and voice calls received and/or in progress at the portable voice unit 151 may be conducted at one or more of the audio accessories 103 via the communication device 101 (e.g. via the various connections 157, 107). Indeed, the input device 113 may be used to select an audio accessory 103 to use to conduct the voice call, and/or to switch between the audio accessories 103. Furthermore, in other examples, the communication device 101 may initiate voice calls via the portable voice unit 151, such that the communication device 101 may provide (e.g. initiate and/or receive) a voice call between the portable voice unit 151 and the communication device 101, the voice call being conducted and/or initiated by the portable voice unit 151 with, for example, the portable voice unit 152, as controlled by the communication device 101. Indeed, in the examples provided herein, the portable voice unit 151 generally conducts a voice call with another device, such as the portable voice unit 152, and the audio of the voice call is provided at a selected audio accessory 103 via the wireless connection 157 and the communication device 101. Furthermore, the communication device 101 generally controls the voice call by transmitting commands, and the like, over the wireless connection 157 to the portable voice unit 151.

Furthermore, the voice call from the portable voice unit 151 may be at least partially controlled via the input device 113 (e.g. one or more of the buttons 115) and/or a respective button 105 at an audio accessory 103 used to conduct the voice call. For example when the voice call is initially in a ringing call state, one or more of the buttons 105, 115 may be used to accept the voice call to change the voice call to an active voice call. Similarly, when the voice call is in an active call state, one or more of the buttons 105, 115 may be used to end the voice call. In general, the connections 107, 157 are used to transmit commands to the portable voice unit 151 upon activation of the buttons 105, 115 to cause the portable voice unit 151 to accept the voice call and/or end the voice call. However, the voice call may be controlled in any suitable manner, including, but not limited to, using voice commands received at an audio accessory 103 and/or the communication device 101.

Furthermore, the communication device 101 may be further configured to conduct a second voice call with the second communication device 122, via the LAN 119 and/or the call server 117, and include the second voice call on the voice call from the portable voice unit 151. Indeed, in these examples, the communication device 101 is configured to act as a communication hub between the portable voice unit 151, the plurality of audio accessories 103 and the call server 117 and/or the second communication device 122.

Indeed, in yet further examples, the communication device 101 may be further configured to forward the voice call to the second communication device 122 and/or receipt of the voice call at the communication device 101 may cause both of the communication devices 101, 122 to ring (e.g. in a group calling scenario), in which case the voice call may be answered and/or picked up at one or both of the communication devices 101, 122 (e.g. in a call pickup scenario).

Figure 2:
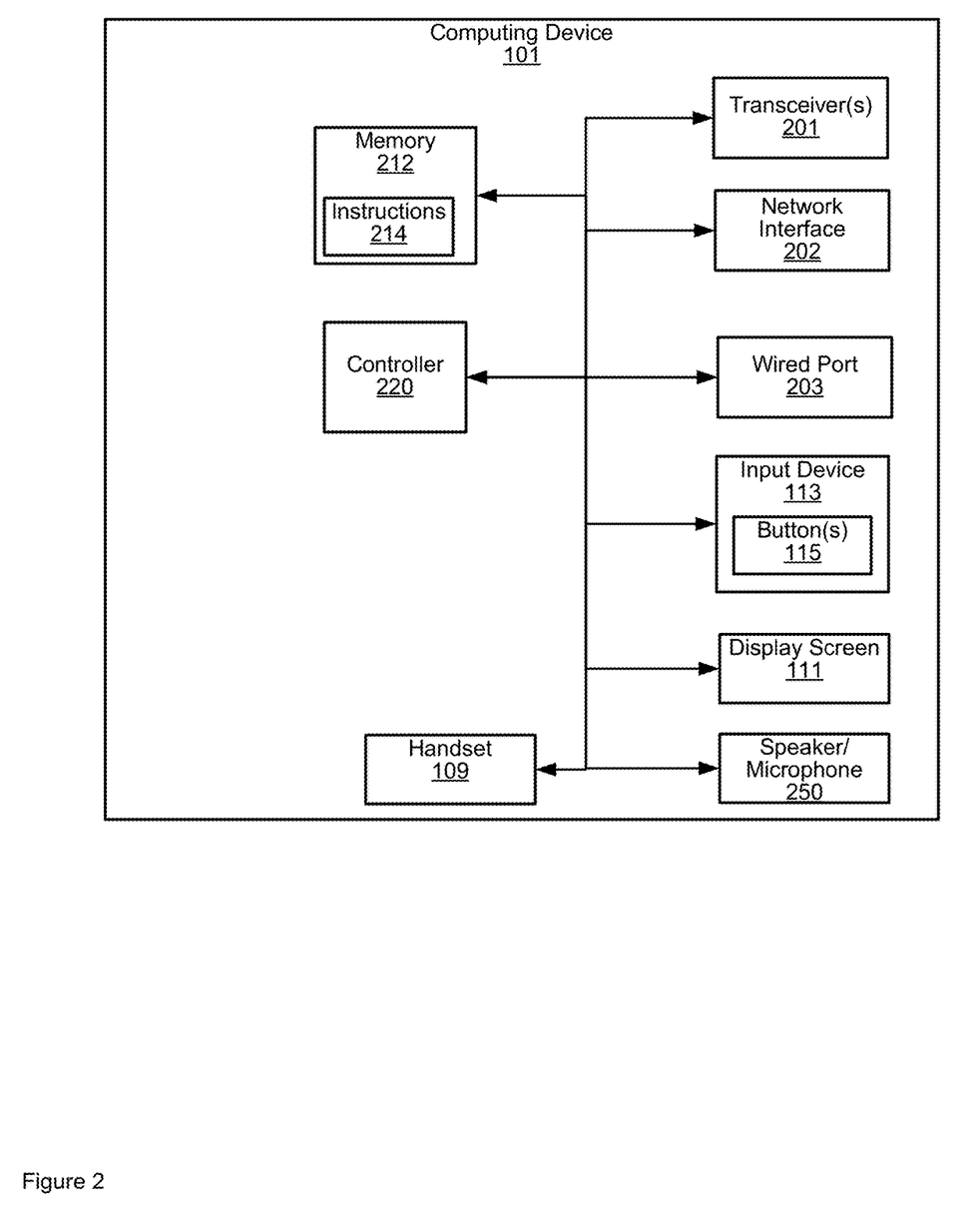
FIG. 2 illustrates an example communication device that communicates with a portable voice unit, in accordance with exemplary embodiments of the specification.

Attention is next directed to FIG. 2 which depicts an example schematic diagram of the communication device 101. The communication device 101 comprises: at least one transceiver 201; a network interface 202; at least one wired port 203 (which may be optional); the display screen 111 (which may be optional); the input device 113 including the button 115; a memory 212 storing instructions 214; and a controller 220 communicatively coupled to the other components of the communication device 101 via a computer bus, and the like.

As depicted, the communication device 101 further comprises a speaker/microphone 250 and/or another audio accessory, which may be used to provide a voice call and/or be controlled by the controller 220 to provide a "ringing" as an indication of a received voice call in a ringing call state. The handset 109 is further depicted and may also be used to conduct a voice call.

The at least one transceiver 201 may comprise any suitable wireless transceiver used to implement one or more of the wireless connections 107, 157. Hence, the at least one transceiver 201 may comprise any suitable combination of one or more Bluetooth™ transceivers, one or more Zigbee™ transceivers, one or more WiFi transceivers, and the like. Indeed, any suitable wideband, or narrow-band transceiver is within the scope of the present specification.

The network interface 202 may comprise any suitable network interface for maintaining the network connection 116 with the LAN 119. In some examples, the network interface 202 may be used in conjunction with the at least one transceiver 201 to maintain the network connection 116 (e.g. when the network connection 116 is wireless), and/or the at least one transceiver 201 may be combined with the network interface 202. In examples, the at least one transceiver 201 and the network interface 202 may be combined in a communication interface The at least one wired port 203 may comprise any suitable wired port used to implement one or more wired connections 107, including, but not limited to, a Universal Serial Bus (USB) port, and the like. In some examples, the network interface 202 may be used in conjunction with the at least one wired port 203 to maintain the network connection 116 (e.g. when the network connection 116 is wired), and/or the at least one wired port 203 may be combined with the network interface 202.

The display screen 111, when present, comprises any suitable display screen such as flat panel display screen, and which may include a touch-screen. As described above, the input device 113 may include a keypad and various other buttons including the talk/end call button 115. In examples where the display screen 111 includes a touch-screen, the input device 113, including the button 115, may be at least partially combined with the touch-screen of the display screen 111, such that the button 115, and/or other buttons and/or the keypad of the input device 113, may be provided as virtual buttons at the display screen.

The memory 212 is coupled to the controller 220 and includes a non-transitory machine-readable storage medium that may be any electronic, magnetic, optical, or other physical storage device. The non-transitory machine-readable storage medium of the memory 212 may include, for example, random access memory (RAM), electrically-erasable programmable read-only memory (EEPROM), flash memory, a storage drive, an optical disc, and the like. The memory 212 may also be encoded with executable instructions to implement the functionality of the communication device 101, for example to receive and transmit voice calls and/or to operate the hardware of the communication device 101. In other examples, it is to be appreciated that the memory 212 may be substituted with a cloud-based storage system (e.g. accessible to the controller 220 via the LAN 119).

The memory 212 may also store an operating system and/or other applications, that is executable by the controller 220 to provide general functionality to the device 101, for example, functionality to support various applications such as a user interface to access various features of the communication device 101.

The controller 220 may include one or more of a processor, central processing unit (CPU), a microcontroller, a microprocessor, a processing core, a digital signal processor (DSP) a field-programmable gate array (FPGA), an application-specific integrated circuit (ASIC) or similar. The controller 220 and memory 212 may cooperate to execute various instructions such as the instructions 214.

In particular, when the controller 220 executes the instructions 214, the controller 220 is configured to: establish, using the transceiver 201, the wireless connection 157 with the portable voice unit 151; receive, at the input device 113, a selection of a given audio accessory 103 from the plurality of audio accessories 103, the communication device 101 (and/or the controller 220) acting as a communication hub between the portable voice unit 151 and the plurality of audio accessories 103; provide, between the portable voice unit 151 and the wireless connection 157, a voice call; and, connect, to the given audio accessory 103, the voice call. However, it is understood that the switching and connections for the voice call is between the portable voice unit 151 and another device via the network 159, and in connecting the voice call to the given audio accessory 103, the controller 220 causes audio for the voice to be provided at the given audio accessory 103, and audio received at the given audio accessory 103 is provided on the voice call.

Figure 3:
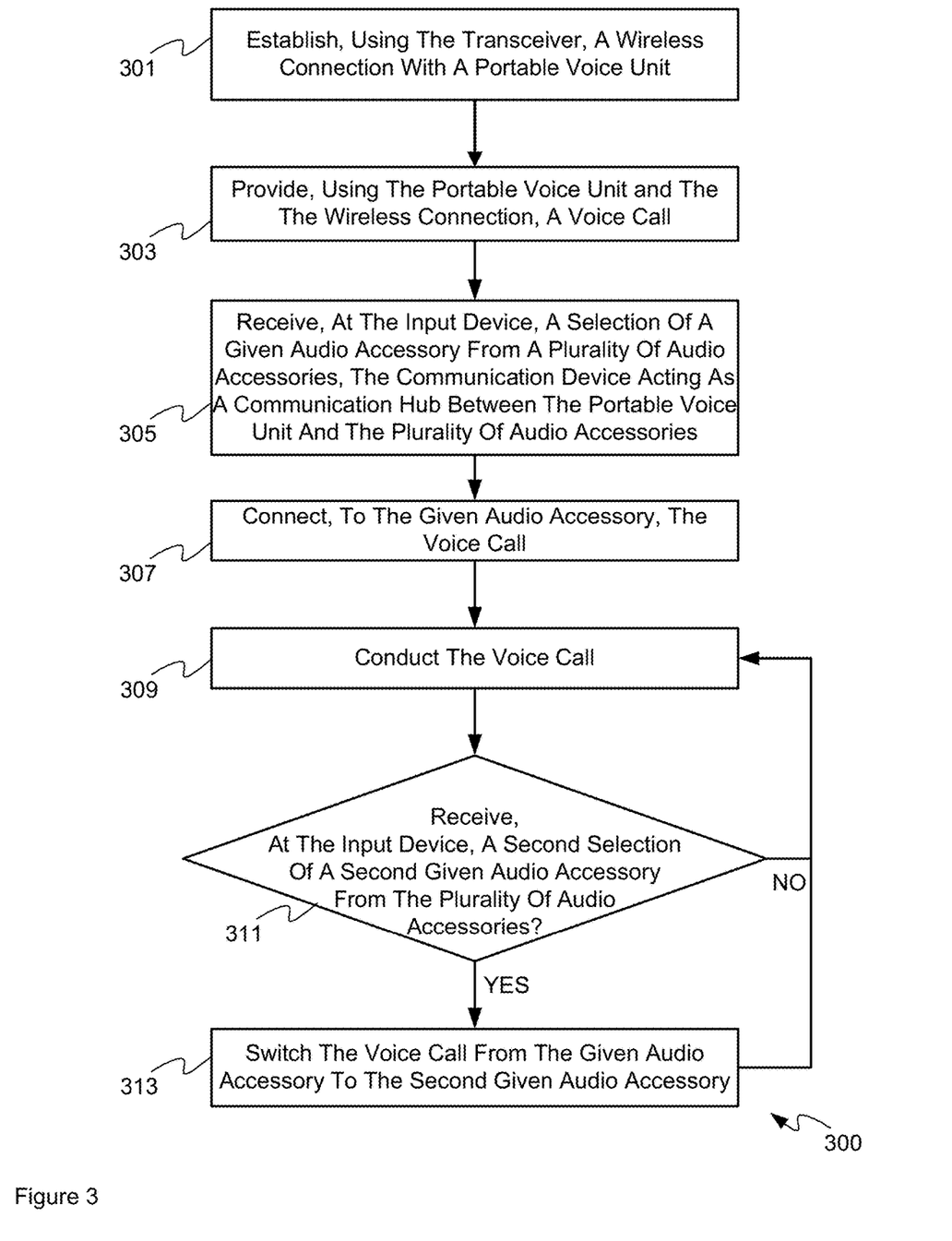
FIG. 3 illustrates a method of providing portable voice unit communications via a communication device, in accordance with further exemplary embodiments of the specification.

Referring to FIG. 3, a flowchart of a method 300 of providing portable voice unit communications via a communication device is depicted. In order to assist in the explanation of method 300, it will be assumed that method 300 may be performed with the communication device 101, and specifically by the controller 220 implementing the instructions 214. Indeed, the method 300 may be one way in which the communication device 101 provides portable voice unit communications for the portable voice unit 151. Furthermore, the following discussion of method 300 may lead to a further understanding of the controller 220, the communication device 101 and its various components, as well as the system 100. Furthermore, it is to be emphasized, that method 300 may not be performed in the exact sequence as shown, and various blocks may be performed in parallel rather than in sequence, or in a different sequence altogether.

Beginning at a block 301, the controller 220 establishes, using the transceiver 201, the wireless connection 157 with the portable voice unit 151. In some examples, the controller 220 may establish the wireless connection 157 when the portable voice unit 151 is within a range of the transceiver 201 using, for example Bluetooth™ protocols, and the like. In some examples, the controller 220 may control the display screen 111 to provide an indication of the wireless connection 157 being established. In yet further examples, the controller 220 may control the display screen 111 to provide a selectable option (e.g. "Yes" or "No") for accepting the wireless connection 157 and/or to accept voice calls from the portable voice unit 151; in particular, a user of the communication device 101 may operate the input device 113 to cause the wireless connection 157 to be established. In yet further examples, the controller 220 may control the display screen 111 to provide a selectable option (e.g. "Yes" or "No") for selecting the portable voice unit 151 as a "line" to be made active at the communication device 101; for example, the communication device 101 may maintain one or more connection to the LAN 119, each of which may be indicated at the display screen 111 as a selectable line, and a "line" to the portable voice unit 151 may also be provided in such an example.

At a block 303, the controller 220 provides, using the portable voice unit 151 and the wireless connection 157, a voice call. Such a voice call may be an incoming call at the portable voice unit 151, which is provided to the communication device 101, or such a voice call may be an outgoing call which the communication device 101 causes the portable voice unit 151 to initiate. In the latter example, the input device 113 of the communication device 101 may be operated to initiate a voice call via the portable voice unit 151.

At a block 305, the controller 220 receives, at the input device 113, a selection of a given audio accessory 103 from the plurality of audio accessories 103, the communication device 101 (and/or the controller 220) acting as a communication hub between the portable voice unit 151 and the plurality of audio accessories 103. In some examples, a user of the communication device 101 may operate the input device 113 to select one of the audio accessories 103 for use with a voice call from the portable voice unit 151. For example, the controller 220 may control the display screen 111 to provide a list of the plurality of audio accessories 103, via a menu system and the like, and/or in response to establishing the wireless connection 157, and the input device 113 may be operated by the user of the communication device 101 to select a given audio accessory 103 of the plurality of audio accessories 103. Alternatively, a speaker/headset button may be operated repeatedly to cycle through a selection of the audio accessories 103. In some examples, either the speaker/microphone 250 and the handset 109 may be selected as an audio accessory at the block 305.

It is further understood that blocks 303 and 305 may occur in any suitable order.

At a block 307, the controller 220 connects, to the given audio accessory 103 (e.g. as selected at the block 305), the voice call such that, at a block 309, the voice call is conducted using speakers and/or microphones of the given audio accessory 103.

In general, the voice call is between the portable voice unit 151 and another communication device, such as the second portable voice unit 152 via the network 159. The voice call as provided at the communication device 101 may hence comprise the audio of the voice call; however, as described below, the controller may be further configured to: control the voice call via receipt of input at the input device 113 and/or via receipt of input at a button 105. In some examples, the voice call may be controlled via voice commands received at a microphone of the communication device, for example a microphone of the speaker/microphone 250. In yet further examples, the voice call may be controlled via voice commands received at a microphone of the audio accessory 103 selected at the block 305. Indeed, any suitable combination of hardware may be used controlling the voice call via the communication device 101 including, but not limited to, the input device 113, a button 115, any of the buttons 105, voice commands received at a microphone of the communication device 101 and/or an audio accessory 103, computer controls, remote controls, and the like.

For example, when the voice call is received at the communication device 101, the voice call may initially be in a ringing call state or an active call state when received from the portable voice unit 151. The call state may be received with the voice call, as call state data and/or the controller 220 may determine the call state from audio data in the voice call. In some of these examples, the controller 220 may be further configured to: determine call state of the voice call; and, one or more of: render, at the display screen 111, an indication of the call state; and provide, at a speaker of the communication device 101 (e.g. at the speaker of the speaker/microphone 250), a respective indication of the call state (e.g. ringing noise, and the like). For example, when the voice call is in a ringing call state, the display screen 111 may be controlled to show a ringing phone icon, and the like; similarly, when the voice call is in an active call state, the display screen 111 may be controlled to show on-hook phone icon, and the like.

In some examples, the controller may be further configured to: prior to connecting the voice call to the given audio accessory 103, receive, at the input device 113 (e.g. via a button 115 and/or via voice commands and/or any other suitable hardware for receiving commands to control the voice call etc.), an acceptance of the voice call; and, in response to receiving the acceptance, connect the voice call to the given audio accessory 103. In these examples, the wireless connection 157 may be established, and the voice call (e.g. in a ringing or active call state) may initially be received at the communication device 101, where the voice call may be accepted or declined via the input device 113. In examples where the voice call is declined, the voice call may continue at the portable voice unit 151.

In yet further examples, as described above, the controller may be further configured to: prior to connecting the voice call to the given audio accessory 103, receive, at the input device 113 (e.g. via a button 115), a selection of the portable voice unit 151 (e.g. as an active line); and, in response to receiving the selection, connect the voice call to the given audio accessory 103. In these examples, the wireless connection 157 may be established, and the call state of the voice call (e.g. in a ringing or active call state) may initially be received at the communication device 101, however, the voice call may not be accepted until the portable voice unit 151 is selected as the active line at the communication device 101. In yet further examples, however, the portable voice unit 151 is automatically selected as the active line once the wireless connection 157 is established.

Regardless, in examples where the voice call is accepted (and/or the portable voice unit 151 is selected as the active line), the voice call is provided to the given accessory 103, via the transceiver 201 and a respective connection 107.

In examples where the voice call is initially in a ringing call state, the controller 220 may be further configured to: determine that the voice call is initially in a ringing call state; and accept the voice call by one or more of: receiving an acceptance of the voice call to change the voice call from the ringing call state to an active call state; and receiving, from the given audio accessory 103, an acceptance of the voice call to change the voice call, via the communication device 101, from the ringing call state to the active call state. For example, the user of the communication device 101 may operate one or more of the button 115, and the respective button 105 of the given audio accessory 103 to accept the voice call, and cause the communication device 101 to communicate with the portable voice unit 151 to communicate with the second portable voice unit 152, and/or components of the network 159, to accept the voice call. Alternatively, voice commands may be used to accept the voice call and/or any other suitable hardware for receiving commands to control the voice call. Thereafter, the user of the communication device 101 may speak on the voice call via the given audio accessory 103 (e.g. selected at the block 305).

At an optional block 311, the controller 220 may determine whether a second selection of a second given audio accessory 103, from the plurality of audio accessories 103, is received, at the input device 113. For example, after a first audio accessory 103 is selected at the block 305, the user of the communication device 101 may operate the input device 113 and/or a respective button 105 at a second audio accessory in a similar manner to select a second audio accessory 103 (e.g. to switch from a DECT handset to a headset).

When a second selection of a second given audio accessory 103 is received at the block 311 (e.g. a "YES" decision at the block 311), at a block 313 the controller 220 switches the voice call from the given audio accessory 103 to the second given audio accessory 103 (e.g. from the audio accessory 103-1 to the given audio accessory 103-2). The voice call then continues and/or is conducted (e.g. at the block 309) at the second given audio accessory 103. For example, the user of the communication device 101 may continue to speak on the voice call via the second given audio accessory 103 (e.g. selected at the block 311).

When no second selection is received at the block 311 (e.g. a "NO" decision at the block 311), the controller 220 continues to conduct the voice call at the block 309 using the given audio accessory 103 selected at the block 305.

While not depicted, the voice call continues to be conducted until the voice call is ended, for example upon receipt of input at the button 115 and/or a respective button 105 of the audio accessory 103 used to conduct the voice call.

In some examples, the controller 220 may be further configured to: maintain, via the network interface 202, and the like, the network connection 116 with the local area network 119; and include the second communication device 122, in communication with the controller 220 via the local area network 119, on the voice call. For example, the communication device 122 may be conferenced in to the voice call from the portable voice unit 151 (e.g. via input received at the input device 113) and/or the communication device 101 may receive a second voice call from the communication device 122 which is combined and/or mixed with the voice call from the portable voice unit 151 (e.g. in a three-way and/or four way and/or "n-way" call, which may also be described as three-party, and/or four-party and/or "n-party" calling).

In some examples, the second communication device 122, may be included on the voice call via the call server 117. In other examples, the second communication device 122, may be included on the voice call via the call server 127.

Hence, in some examples, the controller 220 may be further configured to: maintain, via the network interface 202, and the like, the network connection 116 with the call server 117 via the local area network 119; and include the second communication device 122, in communication with the controller 220 via the call server 117, on the voice call. A user of the second communication device 122 may speak on the voice call via the second communication device 122.

In general, the call server 117 and/or the call server 127 may be used to provide call-server based features on the voice call including, but not limited to, call parking, recording the voice call, group ringing, call pick up, call forwarding, call multiplexing, call conferencing, three-party calling and three-way calling, and/or any other suitable call-server feature. For example, the controller 220 may be further configured to: notify a call server (e.g. the call server 117 and/or the call server 127) of the voice call to cause the call server to provide, on the voice call, one or more of: a call server-based feature, call parking, recording the voice call, group ringing, call pick up, call forwarding, call multiplexing, call conferencing, three-party calling, three-way calling, and the like.

When the call server based features are provided via the call server 117, the controller 220 is further configured to: maintain, via the network interface 202, the network connection 116 with the call server 117 via the local area network 119, the communication device 101 acting as a communication hub between the portable voice unit 151, the plurality of audio accessories 103 and the call server 117; and provide one or more call server-based features for the voice call using the call server 117, as described above.

Indeed, in some examples, a voice call being received at the communication device 101, from the portable voice unit 151, may cause the communication device 101, and the second communication device 122 (e.g. via the LAN 119), to "ring" and/or provide a notification of an incoming voice call, and the voice call may be answered at either of the communication devices 101, 122.

Figure 4:
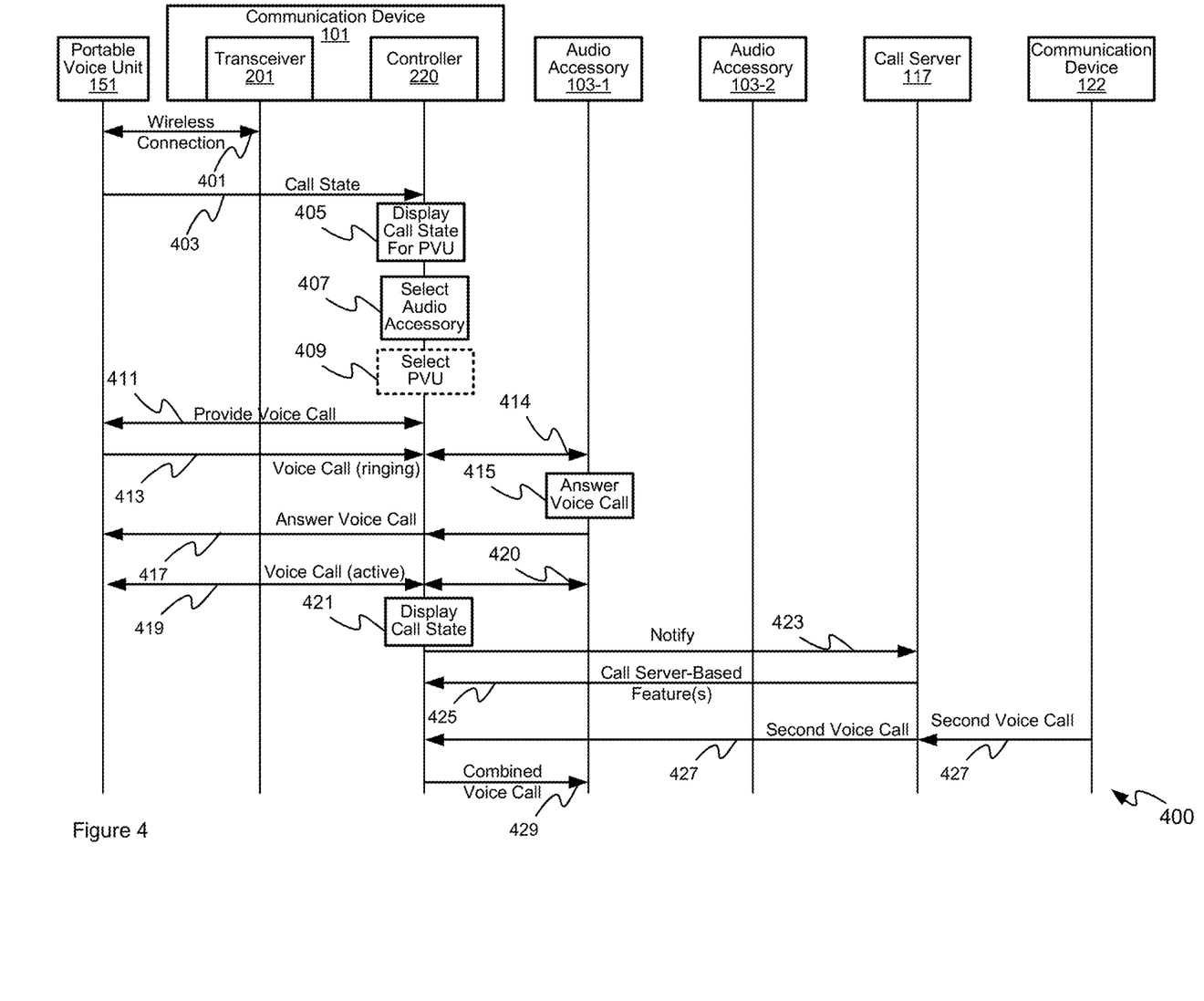
FIG. 4 illustrates an example signal flow diagram showing a method of providing portable voice unit communications implemented in the components of the system of FIG. 1, in accordance with further exemplary embodiments of the specification.

Attention is next directed to FIG. 4 which depicts an example signal flow diagram 400 showing the method 300 implemented in the components of the system 100. While not all components of the system 100 are depicted, they are nonetheless understood to be present. For example, while the LAN 119 is not depicted, communications with the call server 117 are understood to be via the LAN 119.

The portable voice unit 151 and the transceiver 201 generally communicate 401 to establish (e.g. at the block 301 of the method 300) a wireless connection therebetween (e.g. the wireless connection 157).

Figure 5:
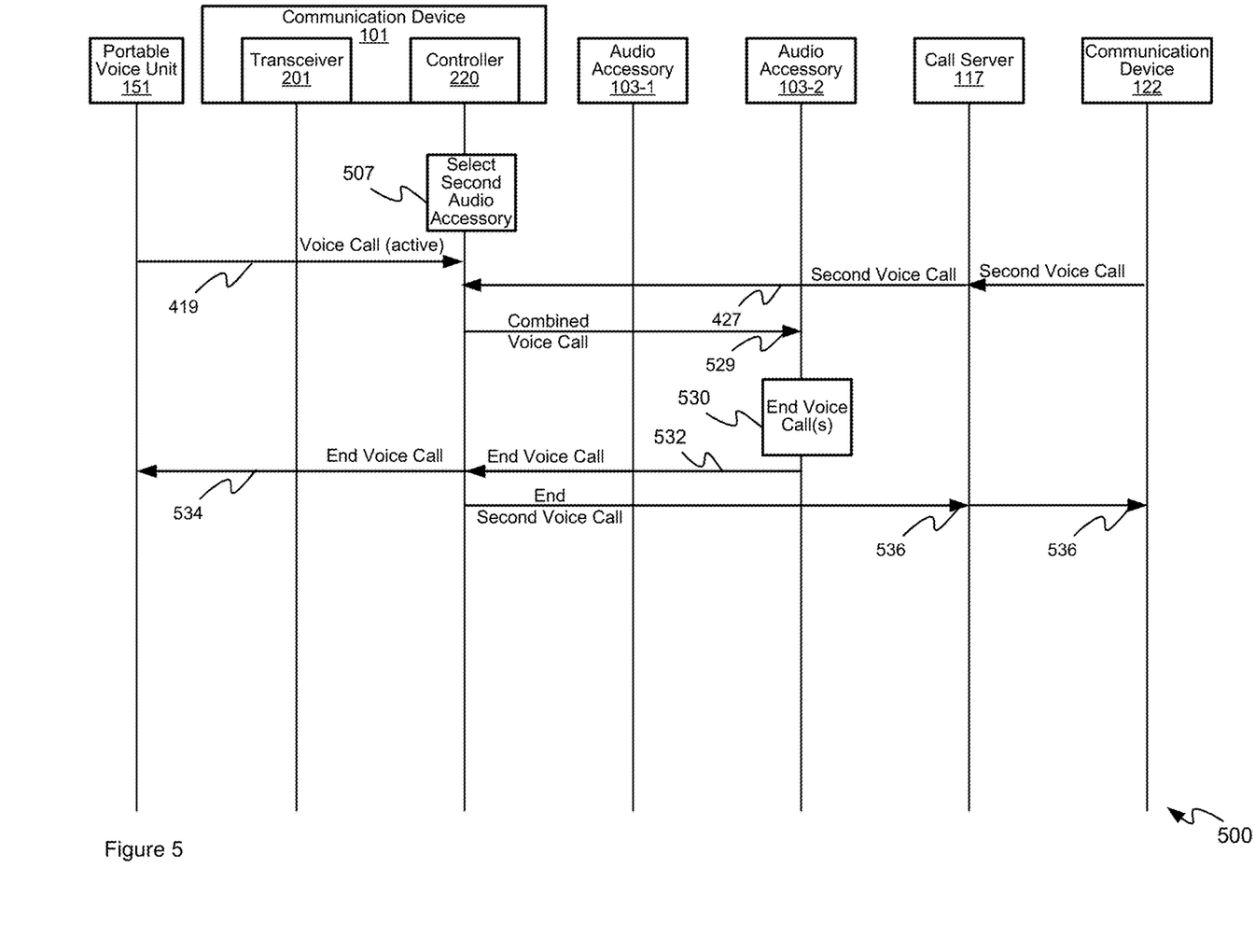
FIG. 5 further illustrates a continuation of the signal flow diagram of FIG. 4, in accordance with further exemplary embodiments of the specification It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present specification.

The portable voice unit 151 may transmit 403 a call state of a voice call to the controller 220 which controls 405 the display screen 111 to provide an indication of the call state of the portable voice unit 151 (interchangeably referred to as the "PVU" in FIG. 4 and FIG. 5). In the present examples, the voice call state is initially understood to be a ringing call state. Alternatively, and/or in addition to the display screen 111 providing an indication of the call state, the communication device 101 may "ring", for example via the speaker/microphone 250, and the like, to indicate the ringing call state.

The controller 220 receives 407 a selection of an audio accessory 103 (e.g. at the block 305 of the method 300); as depicted, the audio accessory 103-1 is selected. As depicted, the controller 220 may further receive 409 a selection of the portable voice unit 151, for example as an active "line" via the input device 113, for example to cause the voice call to be requested and provided at a selected audio accessory 103; such a selection may not include "answering" the voice call which, as depicted, is in a ringing call state (e.g. not an active call state where the voice call is occurring between the portable voice unit 151 and, for example, the portable voice unit 152 and audio is being exchanged therebetween). The selection of the portable voice unit 151 as an active "line" may occur automatically and/or via receipt of input at the input device, and the like.

For the voice call being initially in a ringing call state, the controller 220 may provide 411 the "ringing audio" of voice call from the portable voice unit 151 (e.g. which is conducting the voice call). In response, the controller 220 receives 413 (e.g. at the block 303 of the method 300) the voice call (e.g. received the ringing audio of the voice call) from the portable voice unit 151 via the wireless connection 157, which is initially in a ringing call state. The controller 220 connects 414 e.g. at the block 307 of the method 300) the voice call to the audio accessory 103-1. However, the providing 411 the ringing call state may be optional, as the call state transmitted 403 may cause the communication device 101 and/or the selected audio accessory 103-1 to "ring". In particular, as the voice call is initially in a ringing call state, the audio accessory 103-1 answers 415 the voice call, for example via receipt of input at the button 105-1; alternatively, the voice call may be answered via a button 115. Furthermore, when the voice call in the ringing call state is received at the audio accessory 103-1, a speaker of the audio accessory 103-1 may "ring" to announce the voice call.

When the voice call is answered, the audio accessory 103-1 responsively transmits 417 a command to answer the voice call to the portable voice unit 151 via the controller 220 and/or the communication device 101. The portable voice unit 151 receives the command and answers the voice call. The voice call is then in an active call state 419 and/or the call state changes from ringing to active and voice in the voice call is exchanged 420 on the voice call using the audio accessory 103-1. Furthermore, the controller 220 may change 421 the voice call state indication at the display screen 111 from a ringing call state indication to an active call state indication.

While the present example has been described with respect to the voice call initially being in a ringing call state, in other examples, the voice call may initially be in an active call state; in these examples, the steps 413, 414, 415, 417 of the signal diagram 400 may not occur; rather, once the controller 220 receives 407 a selection of an audio accessory 103, and receives 409 the selection of the portable voice unit 151, the controller 220 may then request that the portable voice unit 151 provide 411 the voice call, and the voice call is then in the active call state 419.

As depicted, the controller 220 may also notify 423 the call server 117 of the call state and voice call such that the call server 117 may connect 425 with the voice call to provide one or more call server-based features on the voice call (e.g. recording the voice call, causing the second communication device 122 to ring, and the like). The call server-based feature(s) to be implemented may be selected via receipt of input at the input device 113 and communicated to the call server 117 via the LAN 119 and/or one or more call server-based feature(s) may be implemented automatically.

As depicted, a second voice call 427 is received at the controller 220 via the call server 117 from the second communication device 122. In some examples, the second voice call may be received in response to the controller 220 requesting that the second communication device 122 be included and/or combined with the voice call from the portable voice unit 151. Regardless, the controller 220 receives the second voice call and transmits 429 a combined voice call to the audio accessory 103-1 (e.g. the second voice call and/or voice data from the second communication device 122 is mixed with the voice call from the portable voice unit 151 at the controller 220).

Attention is next directed to FIG. 5 which depicts an example signal flow diagram 500, which is a continuation of the example signal flow diagram 400.

As depicted, the controller 220 receives 507 a selection of second audio accessory 103 (e.g. a "YES" decision occurs at the block 311 of the method 300), for example the audio accessory 103-2. As such, the controller 220 switches (e.g. at the block 313 of the method 300) the voice call from the audio accessory 103-1 to the audio accessory 103-2, for example by transmitting 529 the combined voice call to the second audio accessory 103-2 rather than the first audio accessory 103-1. In particular, the voice call in the active call state 419 from the portable voice unit 151 continues to be combined with the second voice call 427, but the combined voice call is switched from the first audio accessory 103-1 to the second audio accessory 103-2.

It is further understood that, in some examples, the second voice call may end prior to the switching; in these examples, when the controller 220 receives 507 the selection of second audio accessory 103, only the voice call from the portable voice unit 151 is switched to the second audio accessory 103-2.

As further depicted, the second accessory 130-2 may receive 530 input at the button 105-2 to end one or more of the voice call from the portable voice unit 151 and the second voice call from the communication device 122. As such, the controller 220 receives 532, from the second accessory 130-2, a command to end the voice calls. The controller 220 responsively transmits 534 the command to end the voice call to the portable voice unit 151 and further transmits 536 the command to end the voice call to the second communication device 122 via the call server 117. Both voice calls then end. However, in other examples, the input to end one or more of the voice calls may be received at the input device 113. In yet further examples, the input may be to end the voice call from the portable voice unit 151 but not the second voice call from the communication device 122, or vice versa.

It is understood that the examples of FIG. 4 and FIG. 5 represent one example only of the method 300 and that other examples are within the scope of the present specification. In other examples, the controller 220 may use the portable voice unit 151 to make outgoing voice calls and switch between the audio accessories 103 to select an audio accessory 103 for use in communicating on the outgoing voice calls. In some of these examples, the second communication device 122 may connect with the first communication device 101 (e.g. via the LAN 119) and also use the portable voice unit 151 to make outgoing voice calls. In yet further examples, the second communication device 122 may communicate with the call server 117 to cause the call server to request that the first communication device 101 (e.g. via the LAN 119) use the portable voice unit 151 to make outgoing voice calls (e.g. that the second communication device 122 and/or an audio accessory thereof) conducts.

Indeed, in yet further examples, the second communication device 122 may be connected to a plurality of audio accessories, and a selection of a respective audio accessory occur at the second communication device 122, similar to as described above at the block 305 of the method 300. Furthermore, the second communication device 122 may provide a voice call via the first communication device 101 (e.g. and the LAN 119 and/or the call server 117) using the portable voice unit 151; such voice calls at the second communication device 122 may be incoming or outgoing.

The methods described herein may be used with communication devices (such as a desk phone and/or a stationary phone) equipped with a headset and/or speakerphone accessory, which may be either a corded or cordless headset or speakerphone, and a mobile phone, which may be equipped with a wireless headset. However the mobile phone may be registered with a wireless telephone network and relying on voice connectivity through an internet based application running on the mobile phone (such as a VoIP (Voice over Internet Protocol) application architecture using the mobile phone as a softphone client), or acting as a wireless endpoint where a voice call relies on Wi-Fi and a server-client software relationship is established without the need for a mobile carrier to register.

The users of both the mobile phone and the communication device (such as a desk phone and/or a stationary phone) may be the same person or subscriber, however the present specification is generally directed towards voice call and/or voice path seamlessness, wherein a voice call on a mobile phone continues on a communication device (such as a desk phone and/or a stationary phone), and the communication device may be the mobile phone user's desk phone or the desk phone of another user permitting the mobile phone voice call to be picked on their desk phone. Other examples of implementations at desk phones and/or stationary phones are described hereafter, however such scenarios may be implemented with any suitable communication device.

In an example scenario, audio for an active voice call at a mobile phone call may be switched and/or transferred to a desk phone speakerphone, and/or accessory by initiating the transfer by pressing a 'Speaker/Headset' button on the desk phone; the active voice call may be ended by pressing another button to disconnect (or 'Hang up') the active voice call on the desk phone.

The present specification also addresses a voice call-scenario where a user of a mobile phone prefers to pick up a voice call that arrived through a wireless network carrier, and is ringing on their mobile phone, by picking up the corded (or cordless) handset and/or operating an audio accessory at a desk phone, wherein the desk phone handset and/or accessory becomes the primary audio device for such a voice call and the mobile phone's audio is automatically streamed to the desk phone's handset or audio accessory. Conversely, disconnecting the mobile phone voice call from the wireless network may occur by placing the handset back in the desk phone's cradle. The handset may comprise a handset using a wireless protocol or a corded device.

In another scenario, a mobile phone user may switch the audio for an active voice call to their desk phone's speakerphone by pressing a 'Speaker/Headset' button on the desk phone and conversely ending the voice call by pressing a button on the desk phone to disconnect (or 'Hang up') the active voice call on the desk phone.

In another scenario, the audio for the active mobile phone voice call may be transferred to a desk phone headset when the headset is connected directly to the desk phone through either an analog accessory jack or a USB-port, for example by pressing a 'Speaker/Headset' button on the desk phone, and conversely ending the voice call by hitting a button to disconnect or 'Hang-up' button on the desk phone, or a button on the headset to disconnect the audio, thereby ending the voice call.

In another scenario, a means for a user to switch audio for a voice call on a mobile phone audio to a desk phone is provided through a headset that is associated with the desk phone using a wireless standard protocol (such as Bluetooth™ or DECT) intended for connecting a cordless headset, wherein a button on the headset once pressed, such as the 'Talk/End Call' button on a DECT headset, ends the voice call if a mobile phone voice call is in progress through a wireless phone network (or mobile carrier network).

A problem often arises when a user may want to place a voice call using their mobile phone, but their preference is to make the phone voice call (such as an important business voice call) using their desk phone because it is possibly more convenient, thus when a mobile phone is the user's primary means of communicating, relying on the wireless telephone network (for example, a mobile carrier and the user's mobile phone stores a phone number of a contact, which may be why the mobile phone is used to place the voice call). Hence, in these scenarios, a speakerphone associated with the desk phone may be connected with the mobile phone via the desk phone using a wireless standard protocol (such as Bluetooth™) by pushing a button (such as a 'Talk/End Call' button), wherein the user of the speakerphone places a voice call using the mobile phone and a wireless network (mobile carrier). Conversely, the user can end the voice call by hitting the 'Talk/End Call' button on the speakerphone.

In yet a further scenario, a mobile phone user may wish to use a wireless device previously paired with a desk phone such as a headset (for example, a Bluetooth™ headset) and push a button (such as the 'Talk/End Call' button) that initiates a voice path on the mobile phone to make a voice call, thereby allowing the user to move while talking on the wireless device. Similarly, pressing a button such as 'Talk/End Call on the same wireless device (paired with the desk phone) ends the mobile phone voice call.

In yet a further scenario, a user may answer a voice call that is received on a mobile phone through a wireless telephone network, such as a mobile carrier, and by pressing a button on the desk phone such as a "Speaker/Headset" button, a built-in speakerphone on the desk phone may provide the primary audio for the voice call received from the wireless telephone network. Furthermore, other desk phone accessories that are associated with the desk phone can provide the primary audio for the voice call received through the wireless telephone network as well. For example, a user of a mobile phone may pick up a voice call received through the mobile carrier at the mobile phone (e.g. the mobile phone is ringing) by pressing a button (for example a 'Talk/End Call' button) on an audio accessory (for example, an Integrated DECT Headset) that is associated (or paired) with the desk phone, so the user can use a headset as a secondary audio device for the voice call.

In yet a further scenario, a button on the desk phone, used for selecting a primary or secondary phone line, may be pushed to deliver audio to any desk phone audio accessory (such as corded or cordless audio accessories that are paired or connected with the desk phone). Alternatively, a voice call received through a mobile phone's wireless telephone network, and transferred to a desk phone, may be received on another desk phone on a same local area network, or an analog circuit-switched network, such as an analog phone equipped to receive calls on multiple ringing lines.

In yet a further scenario, a user may dial into a conference call (e.g. a voice call) from a car phone, for example via a built-in car cellular phone and/or portable voice unit. Once the user arrives at a destination (e.g. home), the user may use a Bluetooth™ headset, and the like, and transfer the audio of the voice call being conducted via the car phone to the headset. While talking on the headset, the user may walk into their home (and/or destination) and press a speakerphone button on a home (or office) phone (e.g. a desktop phone, a fridge phone, and the like), which automatically causes the audio of the voice call (which is still being conducted via the car phone) to transfer from the headset to a speaker and/or audio accessory of the home phone.

The devices, systems and methods generally described in this specification may generally enable a voice call, received at a mobile phone through a wireless telephone network, to be connected to an audio accessory of a desk phone, so that they may operate under system-administered governance to allow mobile phone calls to be either automatically received on a primary desk phone (for example, not allowing anyone else's desk phone or accessory device to inadvertently pick up the audio for a designated mobile phone), or allow audio for a mobile phone to be received on multiple desk phones on the same local area network. For example, at a small business, mobile voice calls received at a mobile phone, using the same wireless network designated directory number (DN), or multiple DNs calls being sent to the same mobile phone, may cause numerous desk phones to ring and/or answer such an incoming voice call. Similar techniques may be used to ring a plurality of desk phone of voice call center agents, for example.

The present specification has been described above with reference to a number of exemplary embodiments and examples. It should be appreciated that the particular embodiments shown and described herein are illustrative of the specification and its best mode and are not intended to limit in any way the scope of the specification as set forth in the claims. It will be recognized that changes and modifications may be made to the exemplary embodiments without departing from the scope of the present specification. These and other changes or modifications are intended to be included within the scope of the present specification, as expressed in the following claims.

We claim:

1. A method of providing portable voice unit communications via a communication device, the method comprising:
    establishing, using a transceiver of the communication device, a wireless connection with a portable voice unit;
    receiving, at an input device of the communication device, a selection of a given audio accessory from a plurality of audio accessories, the communication device acting as a communication hub between the portable voice unit and the plurality of audio accessories, wherein a system comprises the communication device, the portable voice unit, and the plurality of audio accessories;

providing a voice call between the portable voice unit and an external voice unit using a telecommunications network of the portable voice unit and that does not require communication between the portable voice unit and the communication device, wherein the external voice unit is external to the system;

providing the communication device access to the voice call via the wireless connection between the communication device and the portable voice unit, the portable voice unit presented to a user of the communication device as an active line of a plurality of lines of the communication device;

connecting, from the communication device to the given audio accessory, the voice call;

maintaining, via a network interface of the communication device, a network connection with a local area network; and including one or more of a second communication device and a call server, in communication with the communication device via the local area network, on the voice call, wherein the communication device determines a call state of the communication device, and wherein the communication device provides the call state to the call server.

2. The method of claim 1, further comprising:
controlling the voice call via receipt of input at the input device and communication to the call server.

3. The method of claim 1 further comprising one or more of:
rendering, at a display screen of the communication device, an indication of the call state; and
providing, at a speaker of the communication device, a respective indication of the call state.

4. The method of claim 1, further comprising:
prior to connecting the voice call to the given audio accessory, receiving, at the communication device, at the input device, a user selection of the portable voice unit; and, in response to receiving the selection, connecting the voice call to the given audio accessory.

5. The method of claim 1, further comprising:
determining, at the communication device, that the voice call is initially in a ringing call state; and
accepting the voice call by one or more of:
receiving, at the input device, an acceptance of the voice call to change the voice call from the ringing call state to an active call state; and
prior to connecting the voice call to the given audio accessory, receiving, at the communication device, from the given audio accessory, a respective acceptance of the voice call to change the voice call, via the communication device, from the ringing call state to the active call state.

6. The method of claim 1, further comprising:
receiving, at the input device, a second selection of a second given audio accessory from the plurality of audio accessories; and, in response,
switching the voice call from the given audio accessory to the second given audio accessory.

7. The method of claim 1, wherein the network connection with the local area network includes the second communication device, in communication with the communication device via the local area network, on the voice call.

8. The method of claim 1, wherein the network connection with the call server via the local area network includes the second communication device, in communication with the communication device via the call server, on the voice call.

9. The method of claim 1, further comprising:
notifying, at the communication device, the call server to cause the call server to provide, on the voice call, one or more of: a call server-based feature, call parking, recording the voice call, group ringing, call pickup, call forwarding, call multiplexing, call conferencing, and three-way calling.

10. The method of claim 1, further comprising:
providing one or more call server-based features for the voice call using the call server; and
providing, by the communication device, voice commands to the portable voice unit.

11. A communication device for providing portable voice unit communications, the communication device comprising:
a transceiver; an input device; and a controller communicatively coupled to the transceiver and the input device, the controller configured to:
establish, using the transceiver, a wireless connection with a portable voice unit;
receive, at the input device, a selection of a given audio accessory from a plurality of audio accessories, the communication device acting as a communication hub between the portable voice unit and the plurality of audio accessories, the portable voice unit presented to a user of the communication device as an active line of a plurality of lines of the communication device;
access, via the wireless connection, a voice call between the portable voice unit and an external voice unit that uses a telecommunications network of the portable voice unit, wherein the voice call between the portable voice unit and the external voice unit does not require communication between the portable voice unit and the communication device; and,
connect, to the given audio accessory, the voice call,
wherein the controller determines a call state of the communication device, and
wherein the communication device provides the call state to a call server.

12. The communication device of claim 11, wherein the controller is further configured to:
control the voice call via receipt of user input at the input device.

13. The communication device of claim 11, further comprising a display screen, and wherein the controller is further configured to one or more of:
render, at the display screen, an indication of the call state; and
provide, at a speaker of the communication device, a respective indication of the call state.

14. The communication device of claim 11, wherein the controller is further configured to:
prior to connecting the voice call to the given audio accessory, receive, at the input device, a selection of the portable voice unit; and, in response to receiving the selection,
connect the voice call to the given audio accessory.

15. The communication device of claim 11, wherein the controller is further configured to:

determine that the voice call is initially in a ringing call state; and
accept the voice call by one or more of:
receiving an acceptance of the voice call to change the voice call from the ringing call state to an active call state; and
receiving, from the given audio accessory, the acceptance of the voice call to change the voice call, via the communication device, from the ringing call state to the active call state.

16. The communication device of claim 11, wherein the controller is further configured to:
receive, at the input device, a second selection of a second given audio accessory from the plurality of audio accessories; and, in response,
switch the voice call from the given audio accessory to the second given audio accessory.

17. The communication device of claim 11, further comprising a network interface, wherein the controller is further configured to:
maintain, via the network interface, a network connection with a local area network; and
include a second communication device, in communication with the controller via the local area network, on the voice call.

18. The communication device of claim 11, further comprising a network interface, wherein the controller is further configured to:
maintain, via the network interface, a network connection with the call server via a local area network; and
include a second communication device, in communication with the controller via the call server, on the voice call.

19. The communication device of claim 11, wherein the controller is further configured to:
notify the call server of the voice call to cause the call server to provide, on the voice call, one or more of: a call server-based feature, call parking, recording the voice call, group ringing, call pickup, call forwarding, call multiplexing, call conferencing, and three-way calling.

20. The communication device of claim 11, further comprising a network interface, wherein the controller is further configured to:
maintain, via the network interface, a network connection with the call server via a local area network, the communication device acting as the communication hub between the portable voice unit, the plurality of audio accessories and the call server;
provide one or more call server-based features for the voice call using the call server; and
provide, by the communication device, voice commands to the portable voice unit.

* * * * *